Aug. 1, 1933.

C. BATTEGAY 1,920,179

TIME DISTRIBUTION SYSTEM

Filed Feb. 28, 1931

INVENTOR.
Constant Battegay

BY

Cornelius Zabriskie
ATTORNEY.

Aug. 1, 1933. C. BATTEGAY 1,920,179
TIME DISTRIBUTION SYSTEM
Filed Feb. 28, 1931 2 Sheets-Sheet 2

INVENTOR.
Constant Battegay
BY
ATTORNEY.

Patented Aug. 1, 1933

1,920,179

UNITED STATES PATENT OFFICE 1,920,179

TIME DISTRIBUTION SYSTEM

Constant Battegay, Levallois-Perret (Seine), France, assignor to Societe Anonyme des Ateliers Brille Freres, Levallois-Perret, Seine, France, a Corporation of France Application February 28, 1931, Serial No. 519,114, and in France May 3, 1930

5 Claims. (Cl. 58—32)

My invention has for its object a time distribution system wherein the mains serving for the transmission of electric energy are made use of.

It has for its object to ensure such a distribution without any substantial disturbance to the transmission of energy and without the time distribution being substantially affected by the latter.

My invention consists chiefly in emitting between the two conducting wires or between the latter and the earth alternating current impulses at a comparatively high frequency, which impulses are controlled by a main regulator and on the other hand in receiving at the different points of the wires where it is desired to control a receiver, the high frequency current through a circuit preferably tuned to this frequency. The current is then rectified by means of a dry rectifier, the working of which is not subject to disturbances, such as a copper oxide cell and is caused after rectification to act on a time receiver.

My invention has also for its object certain arrangements and forms of execution or of application to be disclosed hereinafter.

I will now proceed to describe, solely by way of example and with reference to accompanying drawings certain particular forms of execution of my invention.

Distant control systems are known which work over electric energy transmitting wires through current impulses at audio frequency acting either directly on mechanical resonators vibrating at similar frequencies or on soft iron electromagnetic relays.

According to my invention, I use such audio frequency currents after rectification by means of one or more copper oxide cells or of a similar dry rectifier.

Such a rectification is not practically possible in the case of an electric time distribution system except through dry rectifiers which do not wear nor require any adjustment and are moreover cheap and efficient. In fact these rectifiers must be disposed at each receiver without increasing substantially the price thereof and must be indefinitely in working order without any supervision. Such a particular application of copper oxide rectifiers or similar rectifiers is specially claimed by me with a view to the distribution of time.

Figure 1:
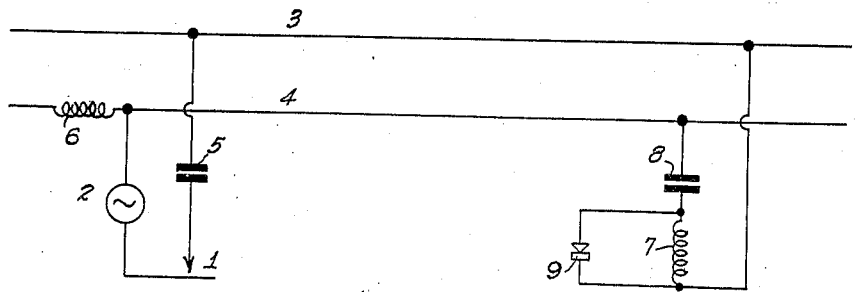
Fig. 1 is a diagrammatical showing of an electric time distribution system by means of direct current receivers fed through direct current mains.

Fig. 1 shows diagrammatically a time distribution system for use with direct current mains.

The system may be used throughout the network or only over part thereof such as a particular illumination feed arrangement. I have supposed in accompanying drawings that the time distribution is provided by the direct action of an impulse every minute. For this purpose, the master clock closes every minute the switch 1 at the A. C. generator 2 connected across the two line wires 3 and 4 in series with a condenser 5.

A choke coil 6 is inserted in one of the line wires for preventing the alternating current from passing into the rest of the D. C. network.

A receiver such as 7 is connected between the line wires through the condenser 8 and is shunted by the rectifier 9.

I have supposed in the case of Fig. 1 that the inductance L of the receiver 7 and the capacity C of the condenser 8 inserted in series together provide resonant conditions for the frequency of the alternating current fed by the generator 2.

Experience shows that the voltage of the alternating current should be above 1 volt by reason of the low efficiency of the copper oxide rectifier for values below 1 volt; on the other hand the voltage should be as low as possible in order not to substantially disturb the distribution of direct current and to reduce the power to be given out by the A. C. generator, which power is proportional to the square of the voltage.

By using polarized high efficiency receivers, I find that an alternating voltage of 1 to 2 volts is sufficient for ensuring the distribution of time.

With a voltage of say 2 volts in a 110 volt network having a power P, the power of the alternator should be $$P \frac{(2)^2}{(110)^2} = \frac{P}{3000}$$

approximately.

Figure 2:
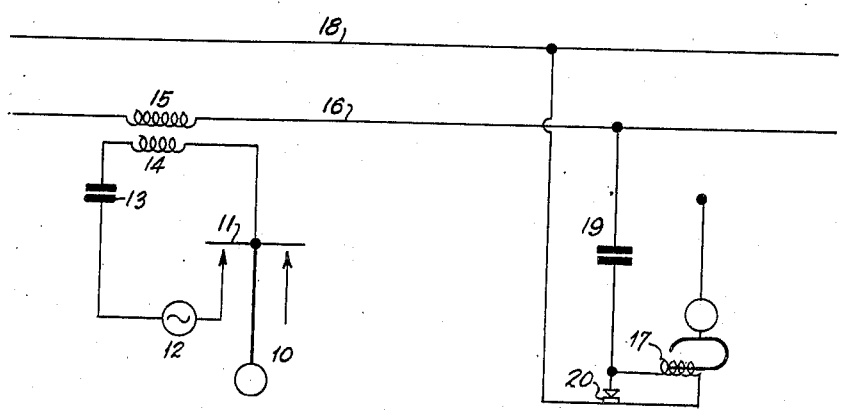
Fig. 2 is a diagrammatical showing of an electric time distribution system making use of alternating current mains and of synchronized pendulums.

Fig. 2 of the drawings show in a diagrammatic manner a time distribution system making use of synchronizing pendulums with alternating current mains. The master clock 10 closes periodically the contact 11 which sends the current of the A. C. generator 12, the frequency of which is comparatively high with reference to that of the main alternating current, through a condenser 13 into the primary 14 of a transformer the secondary 15 of which is inserted in one of the wires 16 of the main line.

A synchronized pendulum is connected between the two line wires 16 and 18 through the condenser 19. The coil 17 controlling the pendulum is shunted as in the preceding case by a rectifier 20.

When the frequency chosen for the distribution of time is sufficiently high or when the portions of the main current shunted through the condenser 19 are liable to disturb, or else when it is necessary to obtain a sharp resonancy for the audio frequency time distribution current (as is the case for instance when other control devices working at different frequencies are used in the same network), it is not desirable to use the coil of the receiver itself for providing resonancy, but preferably an independent induction coil better suited for the chosen frequency.

Figure 3:
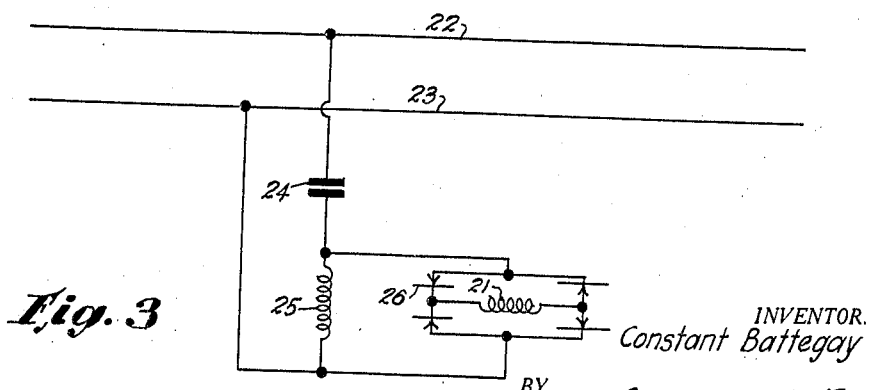
Fig. 3 illustrates diagrammatically means for connecting a receiver particularly for the case of alternating current systems and for high frequency emissions, with the rectification of both alternancies.

In Fig. 3 is shown diagrammatically a receiver the coil 21 of which is not thus connected directly across the two line wires 22 and 23. The connection comprises a condenser 24 and an induction coil 25 providing the resonancy conditions corresponding to the frequency of the time distributing current.

Fig. 3 shows a rectifier 26 constituted by 4 valves or vacuum tubes connected like a Wheatstone bridge across which is connected the coil 21 to be controlled.

Figure 4:
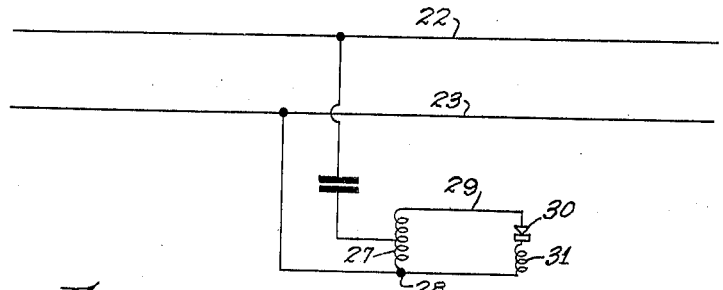
Fig. 4 shows in a diagrammatic manner means for connecting a receiver through an auto-transformer adapted to raise the voltage.

When the voltage received is substantially under one volt, the efficiency of the copper oxide rectifier diminishes. It is then desirable to increase the alternating voltage by means of a transformer or an auto transformer as shown in Fig. 4. In this figure the induction coil 25 of Fig. 3 is replaced by an auto-transformer 27 which allows a voltage to be obtained between its ends 28 and 29 which is above that available directly between the wires 22 and 23. It is also desirable in this case to use a single rectifier 30 in series with the coil 31 of the receiving time piece. The efficiency is greater with the small voltages used in this case, for a single cell than for four cells as in Fig. 3.

For the generation of A. C. at high frequencies, it is advantageous to use an oscillating vacuum tube, as such an oscillator may work a very long time without any supervision.

Figure 5:
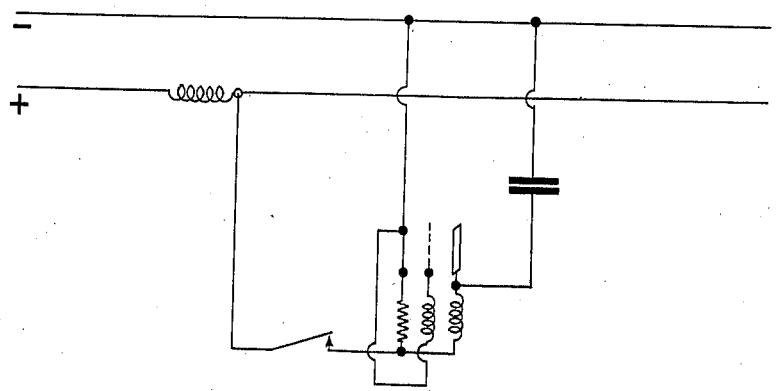
Fig. 5 illustrates diagrammatically a vacuum tube emitter fed from the mains.

As shown in Fig. 5, it is sufficient to close periodically by means of the master clock the filament-heating circuit of the oscillating tube for producing high frequency current impulses.

The oscillating tube may be fed from the mains, as shown in Fig. 5 for the case of D. C. mains.

Obviously and as stated, my invention is not limited in any manner to the forms of application or of execution disclosed hereinabove with particular detail. It covers on the contrary all possible modifications.

As concerns the different applications, I may provide the distribution of time along D. C. or A. C. mains by connecting the high frequency generator either in series or in parallel with the main wires.

The frequency of the time distribution impulses may be any desired frequency, 1, ½ or ¼ of a minute or 1, ½ or ¼ of a second for instance.

In the case of other distant control arrangements being provided through the same network, such arrangements may be used in combination with the time distribution, for instance for the setting right of the receivers or the striking of the hours.

As concerns the forms of execution, the manner of producing the time distributing alternating current and the manner of feeding the mains may be different from those disclosed.

The connections and the control of the receiver time-pieces may also be different from those disclosed while acting in a similar manner.

The feed of the oscillating tube may also be provided by batteries either permanently or as a temporary substitute, said batteries being continuously kept loaded by the main current through copper-oxide rectifiers for instance.

If the oscillating tube were to be fed solely through the current of the mains, means should be provided for setting the receivers right again each time the current has failed by moving them forward through the amount corresponding to the lag thus produced.

What I claim is:

1. An electric control system for clocks comprising electric mains, a master clock, a generator of comparatively high frequency alternating current, a condenser, a circuit containing said generator and condenser in series, a receiving circuit comprising a coil and a condenser tuned to the frequency of the generator and connected across the mains, a rectifier shunting the coil and a secondary time-piece controlled by the coil.

2. An electric control system for clocks comprising electric mains, a master clock, a generator of comparatively high frequency alternating current, a condenser, a circuit containing said generator and condenser in series, a receiving circuit comprising a coil and a condenser tuned to the frequency of the generator and connected across the mains, means for rectifying the current shunted across the coil, and a secondary time-piece controlled by the rectified current provided thereby.

3. In an electric control system for clocks, the combination of a pair of commercial power mains, a master clock, a generator of comparatively high frequency alternating current associated with the clock and connected to transmit periodic high frequency impulses superimposed on the commercial current in the mains, a tuned receiver connected to the mains, a low voltage rectifier in the receiver circuit, a condenser in series with the receiver, and a secondary clock controlled by said rectified current.

4. In an electric control system for clocks, the combination of commercial power mains, a circuit including a source of alternating current of relatively high frequency connected to the mains and arranged to send high frequency current over the mains superimposed on the commercial current, a master clock connected to make and break said circuit periodically, a receiver resonant only to said high frequency current also connected to the mains, a condenser in series with said receiver, a rectifier shunted across said receiver, and a secondary clock connected to be controlled by the rectified current.

5. In an electric control system for clocks, the combination of commercial power mains, a circuit including a source of alternating current of relatively high frequency connected to the mains and arranged to send high frequency current over the mains superimposed on the commercial current, a master clock connected to make and break said circuit periodically, a receiver circuit comprising a coil and a condenser tuned to the frequency of the generator and connected across the mains, a rectifier shunting the coil, and a secondary time piece controlled by the coil.

CONSTANT BATTEGAY.